(12) United States Patent
Tavakolikhakaledi et al.

(10) Patent No.: US 11,548,634 B2
(45) Date of Patent: Jan. 10, 2023

(54) METHOD AND APPARATUS FOR SURFACE ATTACHMENT OF MODULAR UNMANNED AERIAL VEHICLE FOR INSPECTION

(71) Applicant: Avestec Technologies Inc., North Vancouver (CA)

(72) Inventors: Mohammadreza Tavakolikhakaledi, North Vancouver (CA); Pouya Kamalinejad, North Vancouver (CA)

(73) Assignee: AVESTEC TECHNOLOGIES INC., North Vancouver (CA)

(*) Notice: Subject to any disclaimer, the term of this patent is extended or adjusted under 35 U.S.C. 154(b) by 318 days.

(21) Appl. No.: 16/759,654

(22) PCT Filed: Jul. 9, 2018

(86) PCT No.: PCT/CA2018/050835
§ 371 (c)(1),
(2) Date: Apr. 27, 2020

(87) PCT Pub. No.: WO2019/109164
PCT Pub. Date: Jun. 13, 2019

(65) Prior Publication Data
US 2020/0307786 A1    Oct. 1, 2020

Related U.S. Application Data

(60) Provisional application No. 62/578,433, filed on Oct. 28, 2017.

(51) Int. Cl.
*B64C 25/32* (2006.01)
*B64C 39/02* (2006.01)
*B64F 3/02* (2006.01)

(52) U.S. Cl.
CPC ............ *B64C 39/024* (2013.01); *B64C 25/32* (2013.01); *B64C 39/022* (2013.01); *B64F 3/02* (2013.01);

(Continued)

(58) Field of Classification Search
CPC .......... A47L 1/02; B64C 39/024; B64C 25/32; B64C 39/022; B64C 2201/027; B64C 2201/12; B64C 2201/148; B64F 3/02
See application file for complete search history.

(56) References Cited

U.S. PATENT DOCUMENTS

| | | | | |
|---|---|---|---|---|
| 5,351,626 A | * | 10/1994 | Yanagisawa | B62D 57/032 180/164 |
| 5,429,009 A | * | 7/1995 | Wolfe | B62D 57/032 180/8.5 |
| 5,551,525 A | * | 9/1996 | Pack | B62D 57/024 180/8.1 |
| 5,890,553 A | * | 4/1999 | Bar-Cohen | B62D 57/02 180/8.1 |

(Continued)

FOREIGN PATENT DOCUMENTS

| | | |
|---|---|---|
| DE | 10 2014 211721 A1 | 12/2015 |
| JP | 2017 052069 A | 3/2017 |

(Continued)

OTHER PUBLICATIONS

International Search Report and Written Opinion for PCT/CA2018/050835, dated Oct. 12, 2018, 10 pages.

(Continued)

*Primary Examiner* — Justin M Benedik
(74) *Attorney, Agent, or Firm* — Patterson Thuente IP

(57) ABSTRACT

A modular aerial vehicle for inspection of enclosed and open space environments. The aerial vehicle is employed for inspection of various environments in remotely controlled and autonomous fashions. The aerial vehicle is capable of carrying different sensory modules depending on the specific application including surface inspection. Aerial vehicle may be connected to a tether cable for electrical power delivery and transmission of control commands. The aerial vehicle may utilize a landing structure which allows landing on any angled metallic or non-metallic surface.

25 Claims, 12 Drawing Sheets

(52) U.S. Cl.
CPC .... *B64C 2201/027* (2013.01); *B64C 2201/12* (2013.01); *B64C 2201/148* (2013.01)

(56) References Cited

U.S. PATENT DOCUMENTS

| | | | |
|---|---|---|---|
| 6,419,190 | B1 | 7/2002 | Nguegang |
| 2007/0200027 | A1* | 8/2007 | Johnson ................ B64C 39/022 244/3.1 |
| 2012/0187752 | A1* | 7/2012 | Niederberger ....... B62D 57/024 305/165 |
| 2016/0068261 | A1* | 3/2016 | Niederberger ............ A47L 1/02 244/2 |
| 2016/0159468 | A1 | 6/2016 | Harris, III et al. |
| 2017/0073071 | A1 | 3/2017 | Salzmann et al. |
| 2017/0123435 | A1* | 5/2017 | Myeong ................ B25J 9/1676 |

FOREIGN PATENT DOCUMENTS

| | | |
|---|---|---|
| KR | 101536574 B1 | 7/2015 |
| KR | 101707865 B1 | 2/2017 |
| NL | 2 012 975 B1 | 6/2016 |
| WO | WO 2013/076711 A2 | 5/2013 |
| WO | WO 2016/195320 A1 | 12/2016 |
| WO | WO 2017/068036 | 4/2017 |
| WO | WO 2017/184327 A1 | 10/2017 |

OTHER PUBLICATIONS

Extended European Search Report from EP Application 18885016.8, dated Jul. 22, 2021, 9 pgs.

* cited by examiner

METHOD AND APPARATUS FOR SURFACE ATTACHMENT OF MODULAR UNMANNED AERIAL VEHICLE FOR INSPECTION

RELATED APPLICATIONS

This application is a national phase application under 35 U.S.C. § 371 of International Application No. PCT/CA2018/05835 filed on Jul. 9, 2018, which claims priority from U.S. Provisional Patent Application No. 62/578,433 filed on Oct. 28, 2017, the contents of both of which are herein explicitly incorporated by reference in their entirety.

FIELD OF THE INVENTION

The invention relates to the field of remote inspection using unmanned aerial vehicles. More specifically, the invention relates to remotely controlled or autonomous unmanned aerial vehicles capable of carrying different sensory systems for inspection of confined and open environments. Particularly, the invention relates to surface inspection carried out by landing a drone or a smart mobile structure on a surface and performing measurements using various sensors.

BACKGROUND OF THE INVENTION

Public safety is an important concern in industries around the world. It is mandatory to put the public safety in the paramount importance of every industrial practice. Routine standardized inspection is an efficient method to prevent unforeseen dangers. Nearly all the industries including power generation, refineries, chemical, process plants, etc., require frequent inspection of the machineries, large pipes, tanks, pressure vessels, wind turbines, mixing vats, power transmission lines and posts, etc.

Conventionally, qualified personnel are employed to enter or climb up to such spaces and perform inspection whenever routine or emergency inspections are needed. Despite all the trainings these personnel receive, these inspection processes are very dangerous in view of the constrained access and hazardous atmosphere. Moreover, human inspection of inaccessible or hazardous spaces usually requires lengthy and expensive planning, including potential shut down of the normal operation of the unit and preparation of hazard analysis, safety procedures and rescue plans.

Another conventional method involves using visual inspection equipment such as periscope and the like. More recently, remotely controlled robotic vehicles such as crawlers and magnetically attaching rovers carrying visual sensors are being used for inspection. These methods usually suffer from limited motion capability and fail to produce a complete visualization of the structure.

Accordingly, it is desirable to devise a method and a remote controlled or autonomous system which may provide a complete visualization of the structure in a shorter time, at a lower cost and/or at a higher safety level. A method and a remote controlled or autonomous system may be capable of carrying different sensory systems (e.g. coating, UT, etc.) in addition to visual inspection sensors. A method and a remote controlled or autonomous system may allow unrestricted motion for an indefinite time interval.

SUMMARY OF THE INVENTION

According to the aspects herein, there is provided a remotely controlled or autonomous aerial inspection vehicle for open and enclosed spaces. According to one aspect, a remotely controlled or autonomous aerial inspection vehicle may comprise an air frame, at least one propulsion unit, a flight controller unit, a navigation sensor, at least one visual sensor, at least one distance sensor, a plurality of inspection sensors, a wireless data transmitter and receiver unit, a base station unit, a battery and power management unit, and/or a landing assembly having a support structure for vertical landing.

According to another aspect, a remotely controlled or autonomous aerial inspection vehicle may comprise an air frame, multiple propulsion units, a flight controller unit, a navigation sensor, at least one visual sensor, a camera stabilizer and gimbal, at least one distance sensor, a detachable inspection sensor module, a detachable tether cable holder assembly, a tether cable for power and data transmission, a wireless data transmitter and receiver unit, a base station unit, a battery and power management unit, a landing assembly having a support structure for vertical landing, and/or a detachable electromagnetic, vacuum or mechanical landing assembly having a attaching support structure for multi-angle landing.

According to yet another aspect, a method of inspecting using a remotely controlled aerial inspection vehicle may comprise launching and flying the unmanned aerial inspection vehicle in line-of-sight open environment, guiding the vehicle using the remote control system towards the structure, setting the vehicle to hover at an appropriate distance from the structure using the real-time data from distance sensor and visual sensor, performing visual inspection, terminating hover mode, flying towards a secondary target, repeating this process, and/or completing the inspection mission by guiding the vehicle back to the launch point, and/or landing the vehicle and disengaging the propulsion unit.

According to another aspect, a method of inspecting using remotely controlled aerial inspection vehicle may comprise placing the vehicle adjacent to the entrance of an enclosed space (e.g. storage tank), flying the vehicle within the enclosed space, guiding the vehicle using the remote control system towards to the structure or surface inside the enclosed space, setting the vehicle to hover at an appropriate distance from the structure or surface using real-time data from the distance sensor and the visual sensor, performing visual inspection, terminating hover mode, flying towards a secondary target, repeating this process, and/or completing the inspection mission by guiding the vehicle out of the enclosed space back to the launch point, and/or landing the vehicle and disengaging the propulsion unit. A method wherein a repeater unit may be positioned at the entrance of the enclosed space to relay the wireless control data and sensory data to the base station, allowing the user to be positioned at a further and more convenient distance from the entrance of the enclosed space. Additionally, a light source and a secondary video camera may be positioned at the entrance of the enclosed space to provide a live view of the remotely controlled aerial vehicle and the interior of the enclosed space for the base station user who is located at a further distance from the enclosed space to emulate a line-of-sight inspection mission.

According to some aspects, a method of inspecting using autonomous aerial inspection vehicle may comprise preprogramming an inspection mission pre-flight, downloading the mission on to a data storage of the flight controller at the base station or remotely through wireless communication with the flight controller, launching the mission such that the autonomous aerial vehicle flies towards the target using the pre-programmed flight path and real-time data form navigation sensors (e.g., GPS in open space, LIDAR or SONAR in confined space), hovers at an preprogrammed distance, performs the measurement, return to base station or towards a secondary object according to preprogrammed mission. A Wireless link between base station and aerial vehicle may be maintained during the autonomous mission to enable ground user to take over or modify the mission in case of emergency or change of flight plan.

According to some aspects, a method of inspecting using a remotely controlled or autonomous aerial inspection vehicle may comprise an application specific sensory module which may be attached to the aerial vehicle pre-flight at the base station. A method wherein an aerial vehicle may be pre-equipped with primary sensors (e.g., visual and distance sensors), a flight controller, air frame, propulsion unit, navigation sensors, wireless communication unit, battery and power management unit. A method wherein with respect to the designated inspection to be performed, appropriate sensory module may be mounted and fixed to the aerial vehicle and electrical connection between the sensors of the sensory module and the flight controller, battery and power management unit and wireless communication unit may be established. A method wherein depending on energy requirements of the sensory module, extra energy source (e.g. battery) may be included in the sensory module. A method wherein upon attachment of sensory module to aerial vehicle, inspection mission is launched, the aerial vehicle and the sensory module may be guided towards the first target through remote control unit or autonomously by means of a pre-programmed flight path and real-time data from navigation and distance sensors. A method wherein the attached sensory module along with primary sensors of the aerial vehicle perform inspection at the first target after which the aerial vehicle flies towards a secondary target for further inspections or returns to the base station. A method wherein depending on the next inspection mission, the sensory module may be detached and substituted by other appropriate sensory modules to prepare the aerial vehicle for subsequent missions.

According to some aspects, a method of inspecting using a remotely controlled or autonomous aerial inspection vehicle may comprise a tether cable and the associated tether module that may attach to an aerial vehicle or to a sensory module that may attach to an aerial vehicle. The tether cable may transfer electrical energy from the base station to the aerial vehicle. The tether cable may carry communication and control data between aerial vehicle and base station. The tether cable may carry sensory measurement data from aerial vehicle sensors and attached sensory module to base station. The method wherein prior to flight at the base station, a tether module may be connect to a tether cable that may be attached to an aerial vehicle or an aerial vehicle with a sensory module being attached to it, on one side, and to an associated tether unit at the base station on the other side of a tether cable. According to some aspects, for an open space inspection mission, the tether cable of the method, transfers electrical power from base station to aerial vehicle. The tether cable may establish a wired communication link between base station and aerial vehicle for remote control or as a backup communication during an autonomous mission. According to some aspects, for an enclosed space inspection, the tether cable of the method transfers electrical power from base station to aerial vehicle as well as control commands and sensory data between base station and aerial vehicle.

According to some aspects, a method of inspecting using a remotely controlled or autonomous aerial inspection vehicle may comprise modular multi-directional landing structure. A method wherein at least one angled structure may be connected to the frame of the vehicle to serve as horizontal, vertical or angular landing structure. According to an aspect of the method, at the base station, at least one right-angled structure may be connected to a module that may be attached to the frame of an aerial vehicle. During the mission, once the vehicle is positioned at appropriate distance from the target, the structures may rotate to a perpendicular position with respect to a vertical target structure to allow a horizontal landing of aerial vehicle on a vertical surface. The structure may rotate to any desirable angle to attach to a surface in any direction (e.g., floor, ceiling or angled surface). According to some aspects, electromagnet coils may be embedded inside the landing structures to allow attachment and disengagement of the landing structures to and from metallic surfaces. Upon completion of inspection, the landing structures may rotate back to initial position before the aerial vehicle flies towards the next object or prior to landing. According to some aspects, one or multiple vacuum cups may be embedded inside the landing structures to enable attachment and disengagement to and from surface of either magnetic or non-magnetic objects. According to some aspects, a mechanical gripper may be attached to said landing structure to enable attachment and disengagement to and from uneven surfaces of either magnetic or non-magnetic objects.

According to some aspects, a method of inspecting using a remotely controlled or autonomous aerial inspection vehicle may comprise at least one modular fixed or detachable angled landing structure. A method wherein at least one structure may be connected to the frame of the vehicle to serve as angled landing structure. According to some aspects of the method, at the base station, at least one structure connected to a module may be attached to the frame of an aerial vehicle. During the mission, once the vehicle is positioned at appropriate distance from the target, the structures may extend towards the target surface at any desired angle. According to some aspects, electromagnet coils, vacuum cups or mechanical grippers may be embedded inside said landing structures to allow attachment and disengagement of the landing structures to and from surfaces. According to some aspects of the method, after landing structure is attached to the surface, surface inspection may be carried out using non-destructive testing (NDT) sensors (e.g. ultrasonic, EMAT (Electro-Magnetic Acoustic Transducer), Eddy current, coating, surface profilometry, etc.). NDT sensors may be able to move in three dimensions using electrically controlled structures such as actuators. According to some aspects of the method, surface preparation procedures for surface measurement such as cleaning the surface and application of couplant materials to the surface may be performed by a modular structure which incorporates at least one micro-brush and associated driver, at least one couplant reservoir, and/or at least one couplant dispenser. According to some aspects of the method, a dry couplant (e.g., polymers sheet) may be attached to NDT sensor pre-flight to eliminate the need for wet couplant material, couplant reservoir, and/or couplant dispenser. Upon completion of inspection, the landing structures may slide back to initial position before the aerial vehicle flies towards the next object or prior to landing.

According to some aspects, the landing structure and sensors may be embedded in a detachable structure. According to some aspects of the method, once aerial platform reaches to a specified distance from the surface, the detachable structure may detach from the aerial platform and may attach to the surface. The detachable structure may carry at least one sensor and may be powered by an internal power source (e.g., battery) or through a tether cable attached to the aerial platform. The detachable structure may crawl on the surface and performs measurements. The detachable structure may be preprogrammed to perform designated measurements or may receive user commands through the tether cable, wirelessly from aerial platform, and/or wirelessly from ground station. After measurements are completed, the detachable structure may be retrieved by aerial vehicle by means of a retriever mechanism.

According to some aspects, a method of inspecting using a remotely controlled or autonomous aerial inspection vehicle may use an analytics and interface software. According to some aspects of the method, during operation, the aerial vehicle communicates with the operator in real-time by means of an interactive software interface. The user may send flight and inspection commands to the aerial vehicle using the software interface and receive measurement result from aerial vehicle in real time. An analytics and interface software interface generates textual, audio and/or visual representations of the measurements (e.g., 2-dimensional and 3-dimensional image, video, map, graphs, alarms, etc.) to be viewed by the user in real-time. The analytics and interface software may transmit the measurement results to a cloud-based remote server for storage and further processing. The cloud-based server further processes the data and generates a comprehensive inspection reports including post-processed results in textual and graphical formats, comparisons, tagged 2-dimensional and 3-dimensional images and maps and processed videos. A comprehensive report may be available to the user through a secure online access.

BRIEF DESCRIPTION OF THE DRAWINGS

While the invention is claimed in the concluding portions hereof, example aspects are provided in the accompanying detailed description which may be best understood in conjunction with the accompanying diagrams where like parts in each of the several diagrams are labeled with like numbers, and where:

DETAILED DESCRIPTION OF THE DRAWINGS

Referring now in detail to the drawings, there are shown in FIGS. 1 through 12 various aspects and methods of remotely controlled or autonomous aerial inspection vehicle for inspection of open and enclosed spaces. The aerial vehicle may be used for inspection of an open and enclosed space, for example flare stack, interior and exterior of a tank, power transmission line, wind turbine, and/or other industrial facility.

Figure 1:
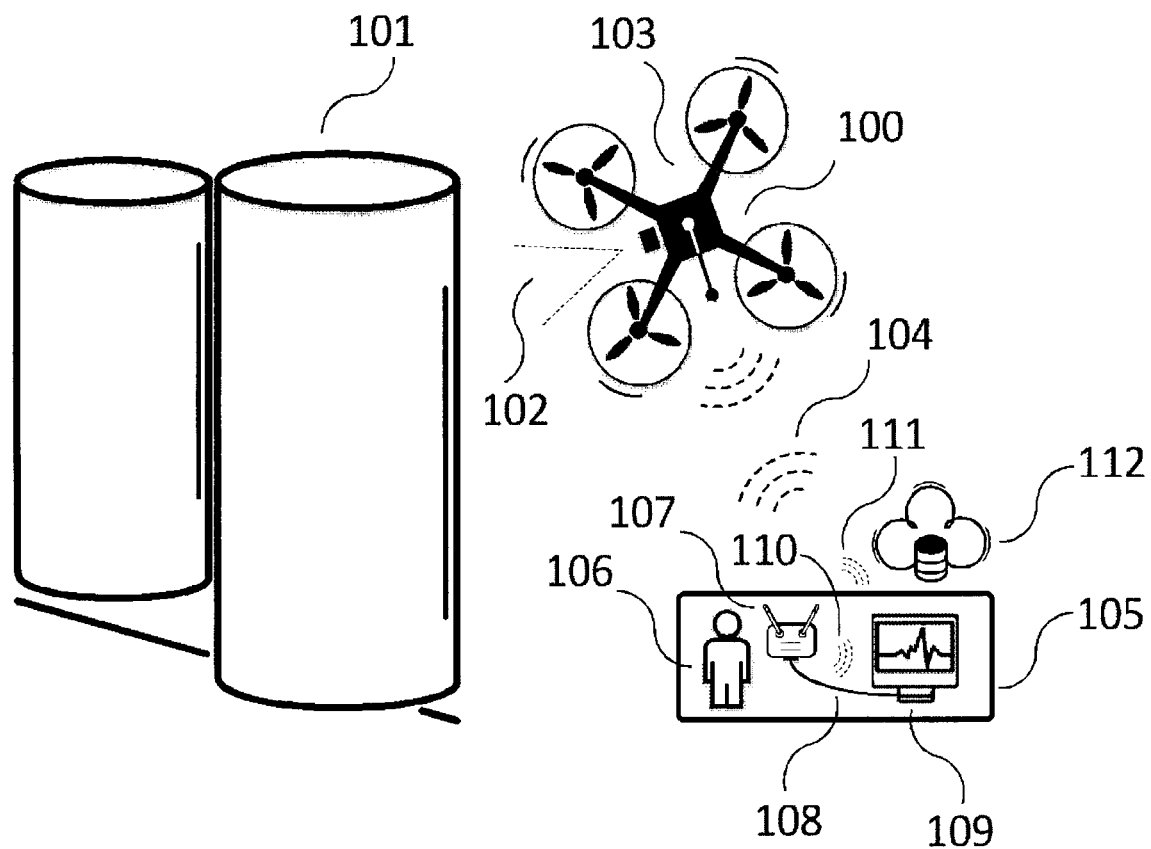
FIG. 1 shows a remotely controlled aerial inspection vehicle operating in open-space environments.

According to an aspect shown in FIG. 1, an aerial vehicle 100 is shown operating in an open space environment for inspection of an exterior of a tank 101. The aerial vehicle 100 may be remotely controlled from a base station 105 where a human user 106, controls the aerial vehicle 100 through a remote controller 107 and a wireless link 104. The wireless link 104 may establish a line-of-sight communication between the remote controller 107 and a wireless transceiver module 103 of the aerial vehicle 100. The aerial vehicle 100 may be equipped with a primary sensory module 102 (e.g., visual sensor, thermal sensor, etc.) for inspection of an exterior of the tank 101. Example sensors may comprise one or more of ultrasound thickness sensors, Eddy current sensors, coating surface profilometry sensors, EMAT sensors, and/or any combination thereof. Measurement data may be transmitted to the base station 105 in a real-time fashion or may be stored in a memory unit of the vehicle 100 for further processing after a completion of a mission. A data transfer link and a remote control link may operate at different frequency bands to avoid interference. The received measurement data at the base station 105 may be transferred to a post processing data-base 109 through a wired line 108 or by a wireless communication link 110 to a post processing data-base 109 or a wireless communication link 111 to a cloud database 112.

Figure 2:
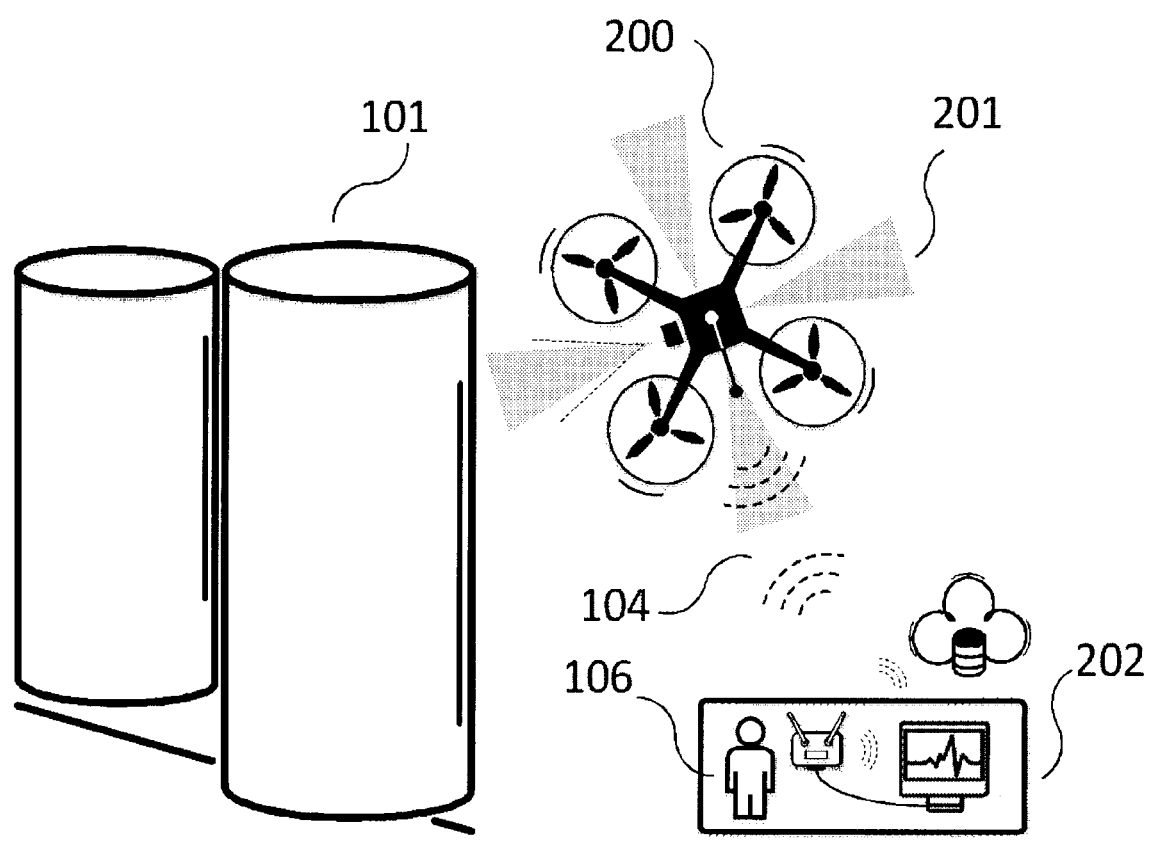
FIG. 2 shows an autonomous aerial inspection vehicle operating in open-space environments.

According to an aspect show in FIG. 2, an aerial vehicle 200 is shown operating in an open space environment for inspection of the exterior of the tank 101. The aerial vehicle 200 may be preprogrammed at a base station 202 pre-flight where a mission path may be broken down into way points and measurement stops. The waypoints and measurement stops may be stored in the internal memory of the aerial vehicle 200. The aerial vehicle 200 may be equipped with collision avoidance sensors 201 (e.g., LIDAR) which continuously scan surroundings of the aerial vehicle 200 to enable the aerial vehicle 200 to avoid unforeseen obstacles along the pre-programmed mission path. The wireless communication link 104 may be always maintained between the base stations 202 and the aerial vehicle 200 to enable the base station user 106 to take over the control of the aerial vehicle 200 in a case of emergency.

Figure 3:
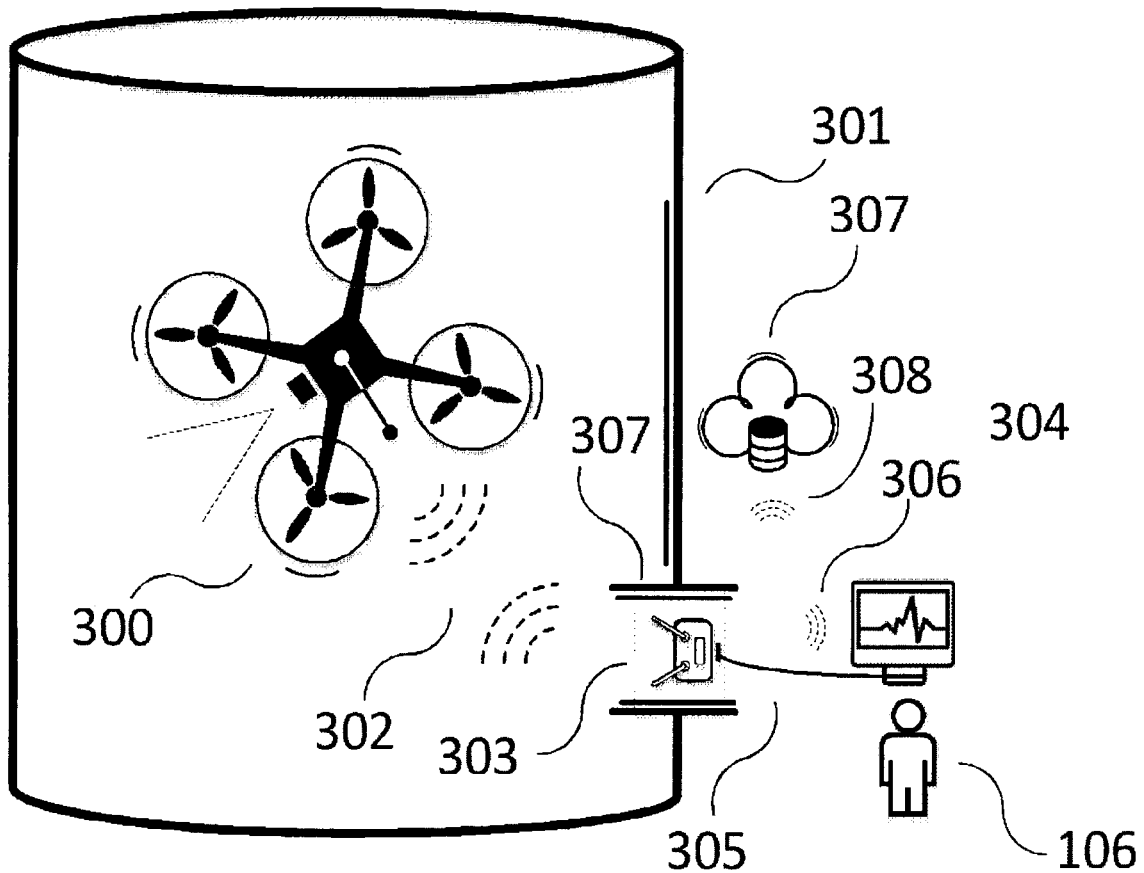
FIG. 3 shows a remotely controlled aerial inspection vehicle operating in enclosed-space environments.

According to an aspect shown in FIG. 3, an aerial vehicle 300 is shown operating in an enclosed space environment for inspection of an interior of a tank 301. In this aspect, the tank may be a metallic structure that may compromise primary navigation as the metallic structure may block GPS or other navigation signals. The metallic structure may also limit the remote control wireless signals within the interior of the tank 301. A wireless repeater 303 may be positioned at an opening 307 of the tank 301. The wireless repeater 303 may maintain a line-of-sight link 302 with the aerial vehicle 300 to communicate the remote control commands. The wireless link 302 may also carry the measurement data to the wireless repeater 303. The base station user 106 may control the mission at a location adjacent to the opening 307 of the tank 301. In case an area adjacent to the opening 307 is unsafe or not easily accessible for user, the base station user 106 may control the mission from a remote location where the wireless repeater 303 relays wireless data to the remotely located base station 304 through a wired link 305 or a wireless link 306 or to a cloud database 307 through the wireless link 308.

Figure 4:
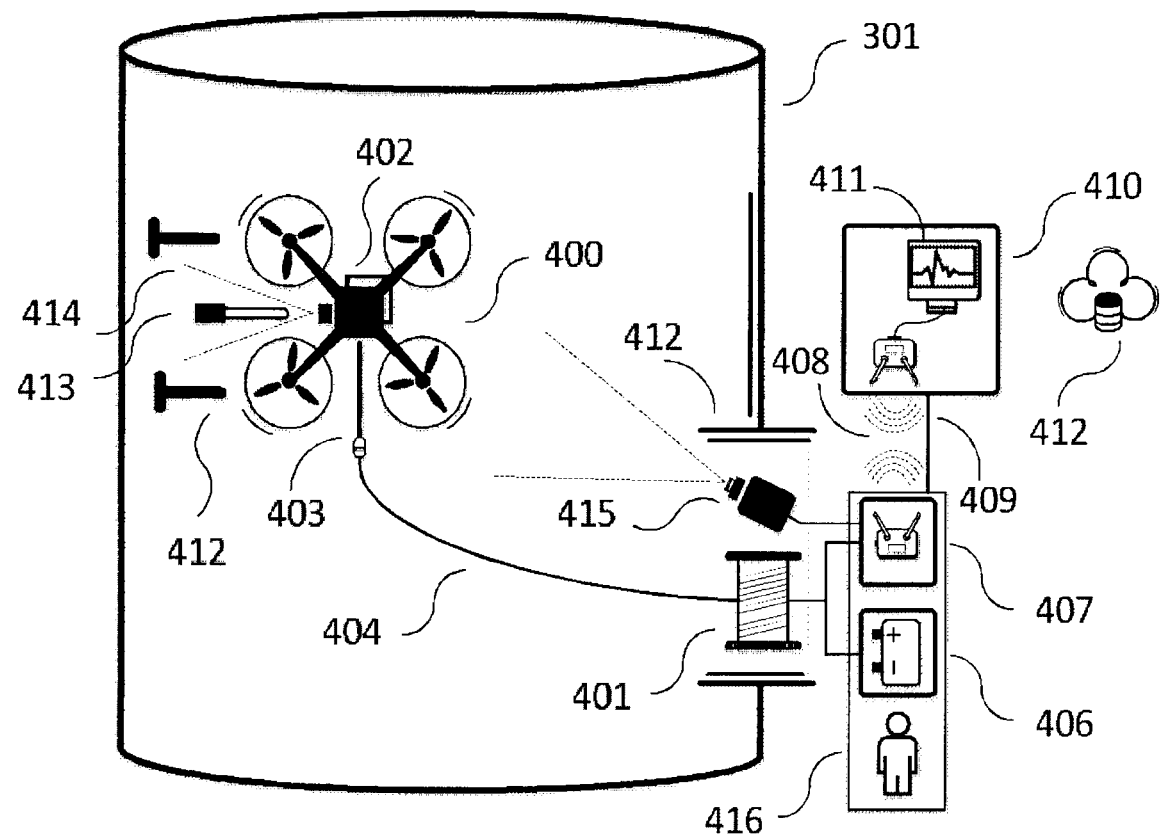
FIG. 4 shows a remotely controlled or autonomous aerial inspection vehicle using a tether cable and the associated tether module operating in enclosed-space environments.

According to an aspect shown in FIG. 4, an aerial vehicle 400 is shown operating in the enclosed space environment for inspection of the interior of the tank 301. According to an aspect, the aerial vehicle 400 may be equipped with a primary sensory unit 414 as well as a sensory module 402, an angled landing structure 413, a secondary sensory unit 414, a tether unit mount 403, and/or a tether cable 404. According to some aspects, the angled landing structure 413 may be detachable from the aerial vehicle 400. According to some more aspects, the angled landing structure 413 may be rotatably coupled to a body frame of the aerial vehicle 400. The tether cable 404 may be connected to a spool 401 positioned at an opening 412 of the tank 301. The spool may be tension-controlled. The spool 401 slightly pulls the tether cable 404 to maintain the cable 404 taut in order to prevent entangling of the cable 404. The tether cable 404 may be connected to a power source 406 positioned at the opening 412 of the tank 301. A power source 406 may be a high capacity DC supply or an AC supply, which is rectified at a base station 416 before being transmitted to the aerial vehicle 400. A controller 407 may be connected to the tether cable 404 to transfer flight control commands to aerial vehicle 400. A tether cable 404 may carry electrical power to enable an indefinitely long flight time. The tether cable 404 may carry flight commands to enable control of the aerial vehicle 400 inside the tank 301. The tether cable 404 may connect to the aerial vehicle 400 through a flexible tether mount structure 403. The base station 415 may be positioned at the opening 412 of the enclosed space 301. In case placement of base station 416 adjacent to the opening 412 is unsafe or inaccessible, a transceiver 407 may be incorporated to carry control commands to a remotely located control station 410 through a wireless link 408 or a wired link 409. The measurement data may be further processed and stored at a remote processor 411 or a cloud database 412. A video camera and an associated light source 415 may be placed at the opening 412 to simulate a line-of-sight view for the remotely located user.

Figure 5:
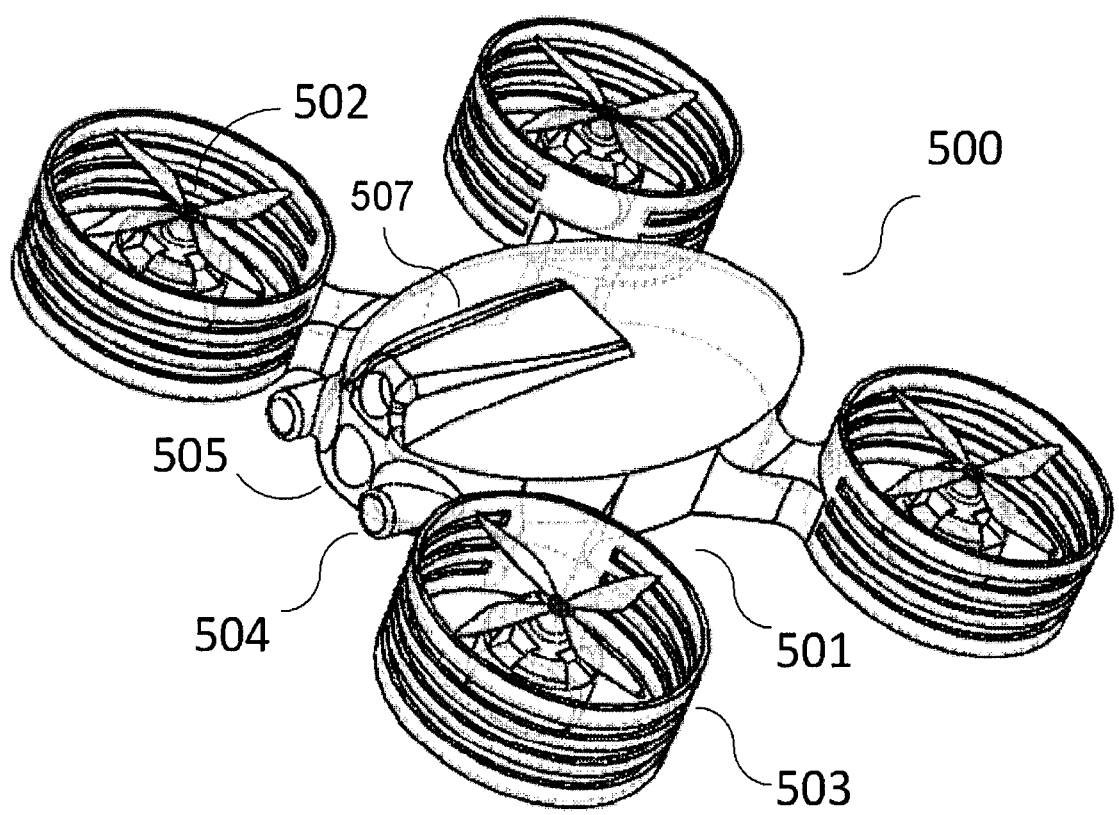
FIG. 5 shows a perspective view of the aerial inspection vehicle.

According to an aspect shown in FIG. 5, a 3-dimensional view of an aerial vehicle 500 for inspection of enclosed and open spaces is shown. According to an aspect, the aerial vehicle 500 may comprise a body frame 501, which houses the one or more aerial vehicle propulsion units 502 and aerial vehicle electronics and mechanical parts, at least four propulsion units 502 which incorporate electrical motors and propellers, a proper guard 503 for each propulsion unit 502, at least one visual sensor 505, a proximity sensor 504, and a primary sensor 507. The aerial vehicle 500 may incorporate further sensory units (not shown) for navigation (e.g., GPS) and light sources (not shown) for inspection of dark enclosed spaces.

Figure 6:
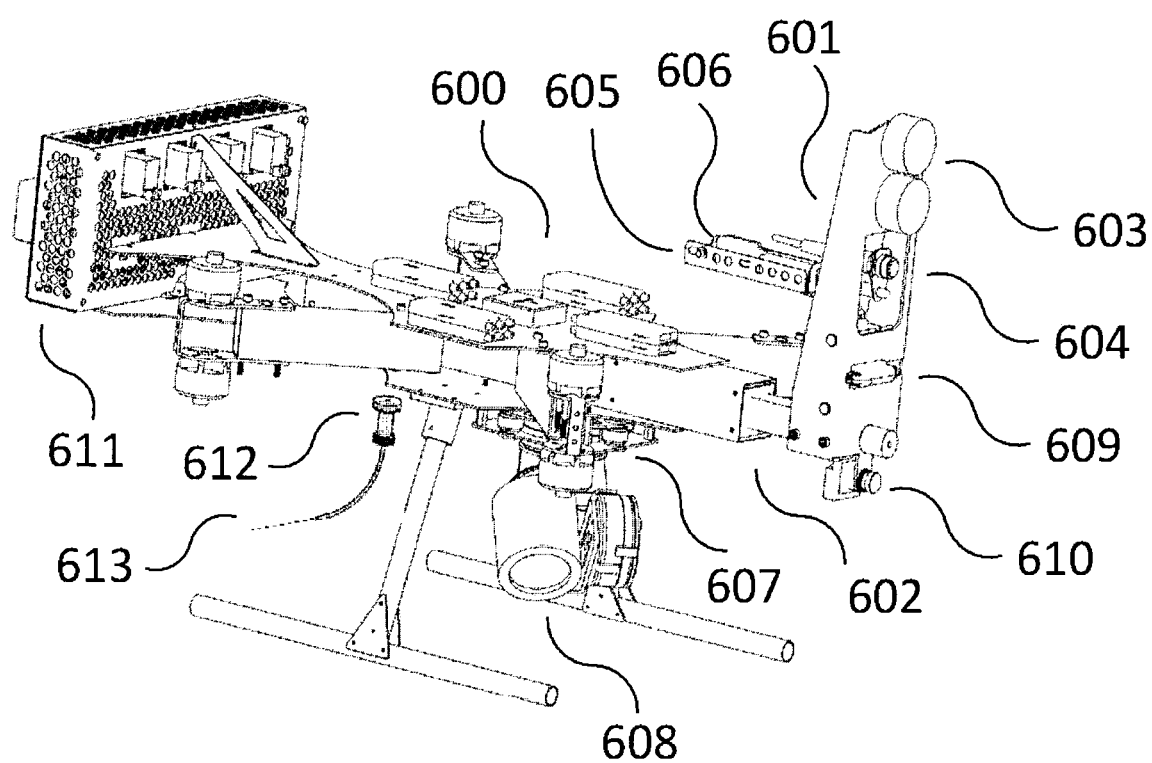
FIG. 6 shows a side perspective view of the aerial vehicle carrying a modular sensory unit, landing structure, and tether system.

According to an aspect shown in FIG. 6, a 3-dimensional view of an aerial vehicle 600 carrying a sensory module 601 is shown. The sensory module 601 may be attached to an aerial vehicle 600 prior to the inspection mission and according to the inspection to be performed. A multi-directional landing structure 602 may be attached to the module 601. The landing structures 602 may rotate in different directions (e.g., upwards, downwards, lateral, and/or any angle in between) to enable landing of aerial vehicle 600 on different surfaces. A vertical position of the landing structure 602 may correspond to upward and downward motion of the landing structure 602 to enable landing of vehicle 600 on horizontal surfaces (e.g., ceiling and floor). A horizontal position of the landing structure 602 may correspond to lateral motion of the landing structure 602 to enable landing on any angled surface(s) (e.g., interior wall of a tank 101, 301). The landing structure 602 may house one or more attaching support structure, such as one or more electromagnetic cores, one or more vacuum cups, and/or one or more mechanical grippers 603. The sensory module 601 may house a sensor 604 (e.g., ultrasound, Eddy current, surface profilometry, EMAT) that may require close proximity to the surface of the tank 101, 301. The sensor 604 may be used to collect measurement data from the surface when the aerial vehicle 600 is attached to the surface. Sensor 604 may be attached to a holder 605 which may move in 3 dimensions by means of electrical actuators 606. The sensory module 601 may employ a motorized gimbal 607 that may house a high-definition visual camera 608. The sensory module 601 may employ inspection sensors 609 (e.g., spectral, gas) and navigation sensors 610. The aerial vehicle 600 may house a tether module 611 and a mounting 612 for the tether cable 613.

Figure 7:
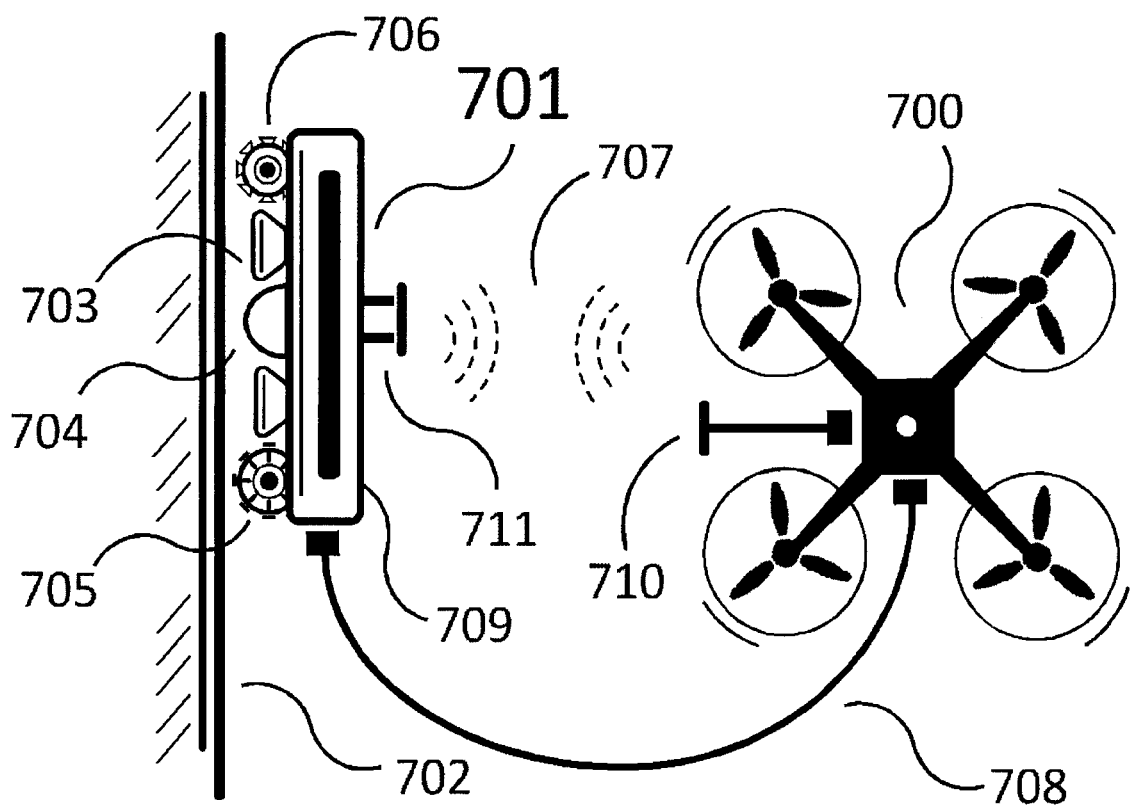
FIG. 7 shows a simplified block diagram of electrical connections between internal blocks of aerial vehicle, internal blocks of sensory and tether modules and between aerial vehicle and sensory and tether modules.

According to an aspect shown in FIG. 7, an aerial vehicle 700 is shown for inspection of a metallic or non-metallic surface. The aerial vehicle 700 may carry a detachable and mobile sensory module 701. Once aerial vehicle 700 gets close enough to a target surface 702, the detachable sensory module 701 detaches from the aerial vehicle 700 and attaches to the target surface 702 by one or more magnetic grippers, one or more vacuumed grippers, one or more mechanical grippers 703, or any combination thereof. The detachable sensory module 701 may carry at least one surface measurement sensor 704 (e.g., ultrasound, Eddy current, EMAT, etc.) and may move on the target surface 702 using one or more magnetic wheels 705, one or more vacuumed wheels 706, or a combination thereof. The wheels 706 may be driven using one or more motors or mechanical grippers. The detachable sensory module 701 may communicate with the aerial vehicle 700 or ground station (not shown in FIG. 7) by a wireless channel 707 or through a tether cable 708. The detachable sensory module 701 may be supplied by an internal power storage 709 (e.g., battery) or may receive energy through the tether cable 708 from a power supply unit (not shown) of the aerial vehicle 700. After measurements are completed, the aerial vehicle 700 may approach the detachable sensory module 701 and retrieve the sensory module 701 by a retriever structure 710. The retriever structure may attach to a surface 711 on the detachable sensory module 701.

Figure 8:
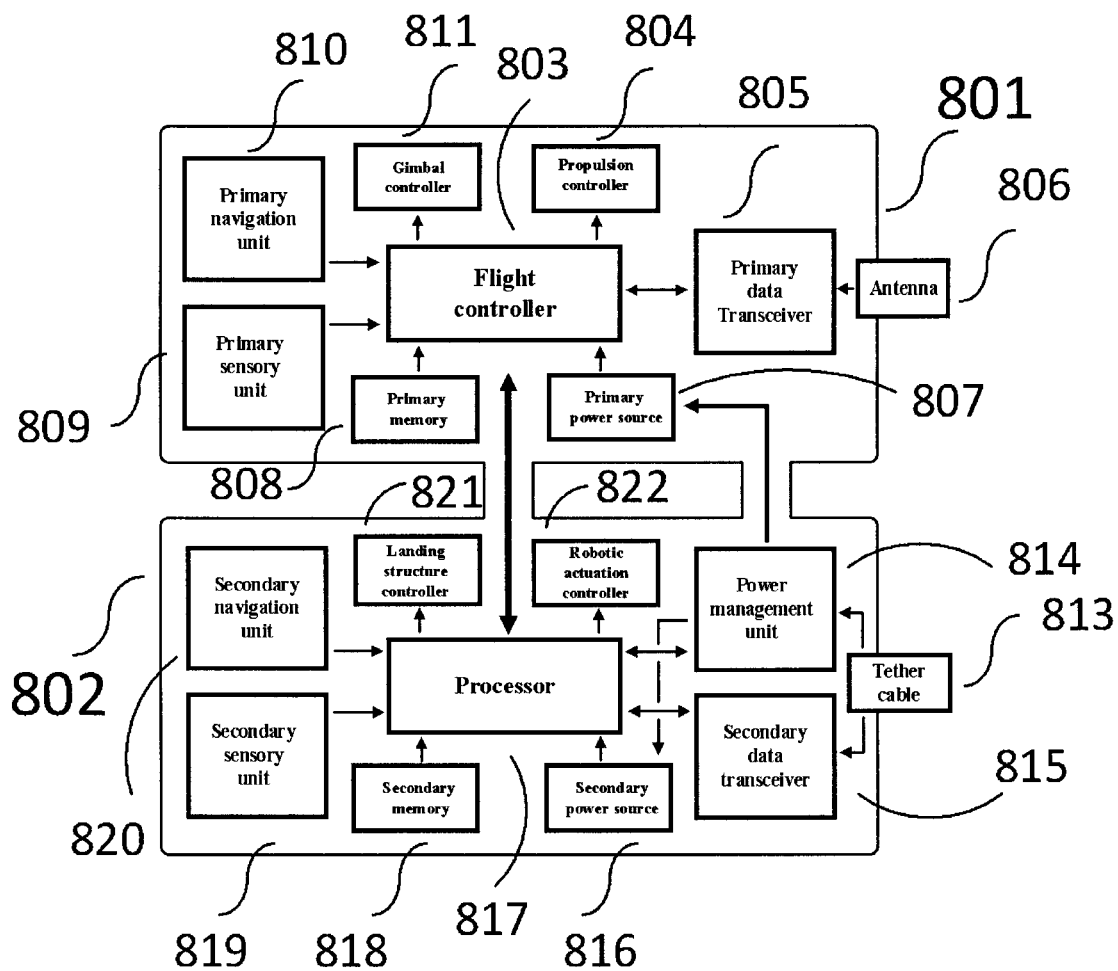
FIG. 8 shows an electrical block diagram of the aerial vehicle.

According to an aspect shown in FIG. 8, a block diagram of system components of an aerial vehicle 100, 200, 300, 400, 500, 600 and the sensory module 102, 402, 601, 701 is shown. An aerial vehicle control board 801 may comprise a flight controller 803 as a main controller unit. Flight controller 803, receives flight command from the operator and/or flight sensors and/or stored flight path and translates the data into appropriate signals to fly and navigate the unmanned aerial vehicle. The flight controller 803 may control a propulsion controller 804 and a gimbal controller 811. Propulsion controller 804 receives commands from the flight controller 803 and dynamically drives and controls the speed of the propulsion unit (e.g., electrical motors and propellers). Gimbal controller 811 receives command from flight controller 803 and dynamically stabilizes and moves a gimbal which may house a sensor (e.g., camera). The flight controller 803 may communicate and may control a primary sensory unit 809. The flight controller 803 may continuously (or periodically) monitor a primary navigation unit 810 to control and correct the flight path. The flight controller 803 may read data and/or instructions from a primary memory unit 808 for flight path data (e.g., in autonomous mode) and/or may write the measurement data to the memory unit 808 to be restored for further processing. The flight controller 803 may be powered by a primary power source 807 (e.g., battery). The flight controller 803 may be in electrical communication with a primary data transceiver 805 to receive flight commands and to transmit real-time telemetry data and measurement data. The primary data transceiver 805 may be connected to an antenna 806 which enables wireless communication with the base station. The control board 802 of sensory module 102, 402, 601, 701 may comprise a processor 817 as a main controller unit. The processor 817 may communicate with the flight controller 803 and may include a landing structure controller 821 and a robotic actuation controller 822. The processor 817 may communicate with and/or may control a secondary sensory unit 819 (e.g., ultrasound, Eddy current, surface profilometry, EMAT). The processor 817 may monitor a secondary navigation unit 820 and may report to the flight controller 803. According to an aspect, the processor 817 may be supplied by a power management unit 814 through a tether cable 813. The power management unit 814 may charge a secondary power source 816 (e.g., a rechargeable battery). The processor 817 may receive control information from and/or write measurement data on a secondary memory unit 818.

Figure 9:
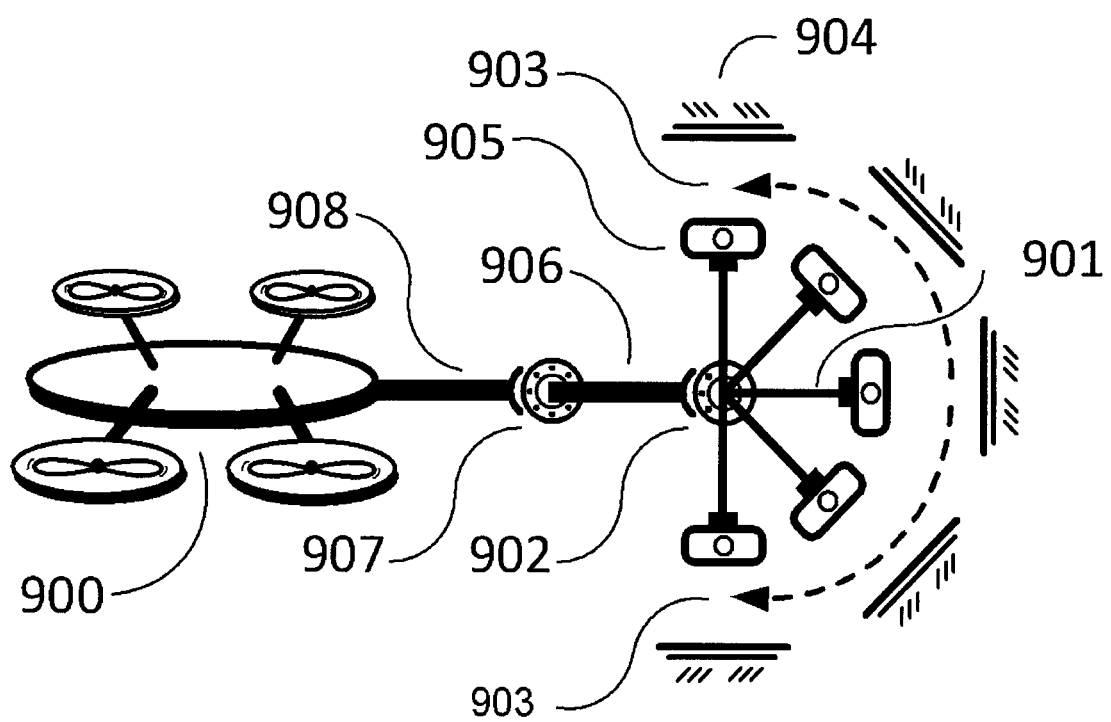
FIG. 9 shows the aerial vehicle having an arm.

According to an aspect shown in FIG. 9, an aerial vehicle 900 may comprise at least one rotary arm 901 that may extend and rotate by any arbitrary angle about a pivot joint 902 along a rotational direction 903. The rotational motion of rotary arm 901 may enable landing on any angular surface 904 relative to aerial vehicle 900. In some aspects, the rotary arm 901 may also extend and/or retract. The rotary arm 901 may carry a surface landing structure 905 such as an electromagnet, a mechanical gripper, a vacuum gripper, and/or any combination thereof. The rotary arm 901 may also carry measurement sensors as previously described. The aerial vehicle 900 may incorporate one or multiple additional rotary arms 906 rotating around additional pivot joints 907 to increase one or more spatial degrees of freedom. The rotary joint 907 may attach to the aerial vehicle 900 through an extendable or a fixed arm 908 or the rotary joint 906 may be integrated inside a frame of the aerial vehicle 900.

Figure 10:
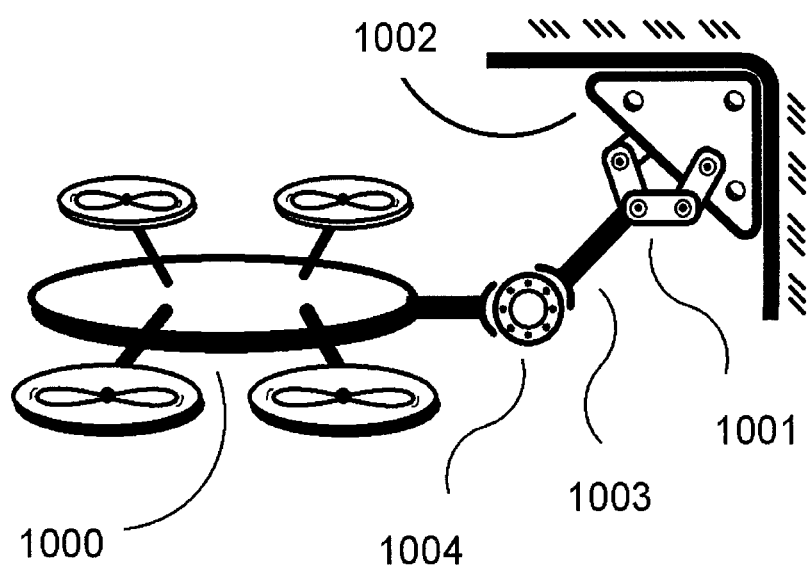
FIG. 10 shows the aerial vehicle attaching to the surface using a mechanical gripper of the arm.

According to an aspect shown in FIG. 10, an aerial vehicle 1000 is shown. The aerial vehicle 1000 may comprise at least one mechanical gripper 1001 which may enable the aerial vehicle 1000 to attach to a non-flat or an uneven surface 1002 (e.g., I-beam, stiffener plate, pipes, etc.). A mechanical gripper 1001 may be mounted on a rotary arm 1003 which may rotate around a pivot joint 1004 for increased freedom of motion. The rotary arm 1003 may be integrated into a frame of the aerial vehicle 1000.

Figure 11:
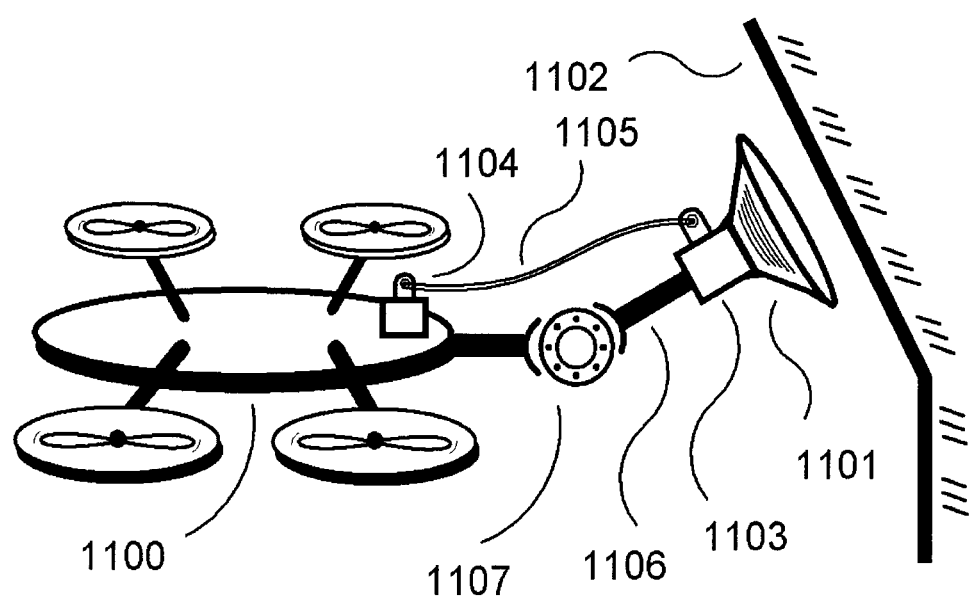
FIG. 11 shows the aerial vehicle attaching to the surface using a vacuum gripper on the arm.

According to an aspect shown in FIG. 11, an aerial vehicle 1100 is shown. The aerial vehicle 1100 may comprise at least one vacuum gripper 1101 which enables the aerial vehicle 1100 to attach to any magnetic or non-magnetic surface 1102. The surface smoothness may be considered relative to the vacuum level, cup cross-section, and cup flexibility. The vacuum gripper 1101 may incorporate a pump 1103 or may receive a pressure differential through a carrier pipe 1105 which may connect to a pump 1104 which may be integrated into a frame of the aerial vehicle 1100. The mechanical gripper 1101 may be mounted on a rotary arm 1106 which rotates around a pivot joint 1107 for increased freedom of motion. The rotary arm 1106 may be integrated into the frame of aerial vehicle 1100.

Figure 12:
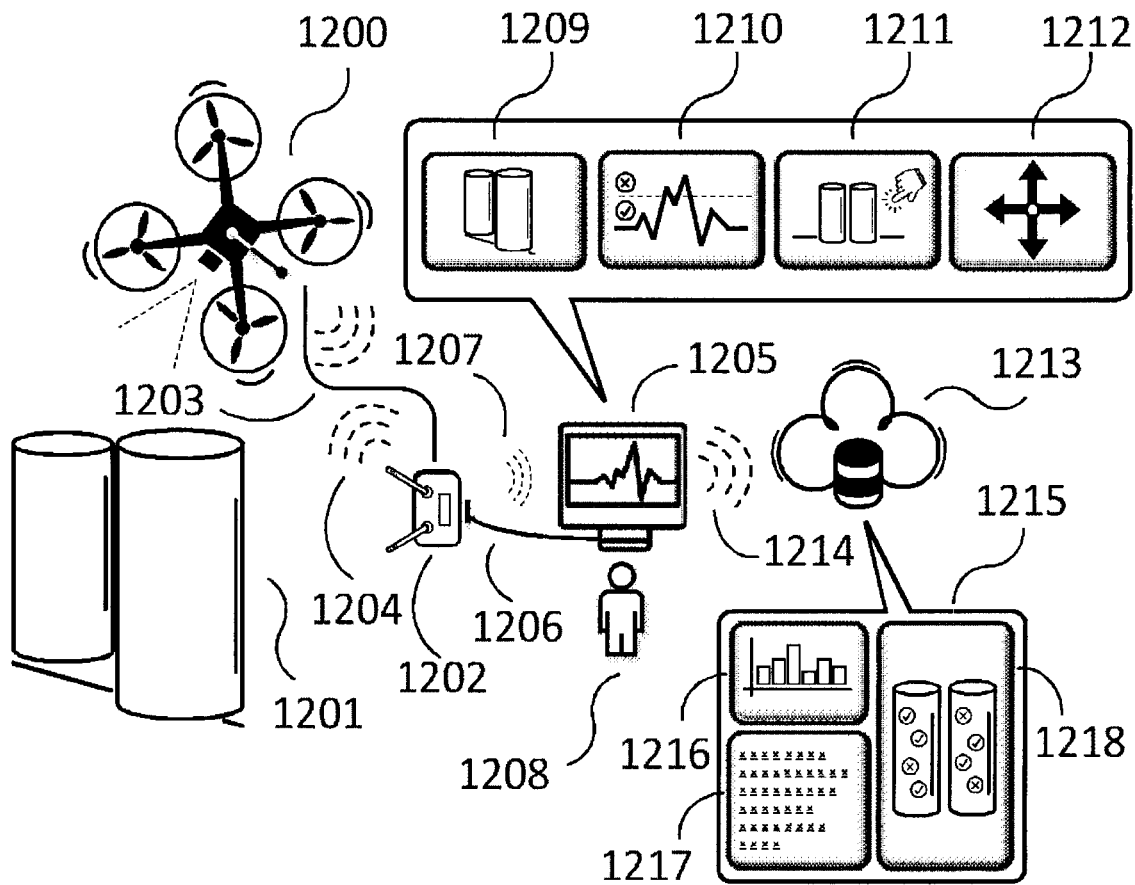
FIG. 12 shows a block diagram of an aerial inspection analysis software system.

According to an aspect shown in FIG. 12, an aerial vehicle 1200 for inspection of the target structure 1201 is shown. The aerial vehicle 1200 communicates with the base station transceiver 1202 through a wired link 1203 or a wireless link 1204. The base station transceiver 1202 may relay data to and from the base station interactive display 1205 through the wired link 1206 or the wireless link 1207. The interactive display 1205 may display the data received from the aerial vehicle 1200 to the user 1208 in real-time. The interactive display 1205 may display real-time video 1209 of target structure 1201. The interactive display 1205 may display primary real-time processed measurement results 1210. The interactive display 1205 may enable the user 1208 to tag individual measurement results on associated spots on a 3-dimensional map 1211 of the target structure. The interactive display 1205 may provide an interface 1212 to enable user 1208 to control aspects of aerial vehicle 1200. The interactive display 1205 may send the received data to a cloud-based server 1213 through a second wireless link 1214 for storage and post processing. The cloud-based server 1213 may further process measurement data and generate an inspection report 1215. The inspection report 1215 may incorporate post-processed measurement results 1216. The inspection report 1215 may incorporate a text summary 1217 of the inspection. The inspection report 1215 may incorporate a visual representation 1218 of the processed measurement results. Although the aspects described herein may have been described individually, any and all aspects may be combined consistent with the understanding of those skilled in the art. The foregoing is considered as illustrative only of the principles of the invention. Further, since numerous changes and modifications will readily occur to those skilled in the art, it is not desired to limit the invention to the exact construction and operation shown and described, and accordingly, all such suitable changes or modifications in structure or operation which may be resorted to are intended to fall within the scope of the claimed invention.

What is claimed is:

1. An aerial vehicle for inspection comprising:
   a body frame;
   at least one propulsion unit coupled to the body frame; and
   a multi-directional landing structure coupled to the body frame;
   wherein the multi-directional landing structure comprises:
      a rotary arm rotating by any arbitrary angle to enable landing on any angular surface; and an attaching support structure configured to attach the multi-directional landing structure to the angular surface.

2. The aerial vehicle according to claim 1, wherein the angular surface comprises any one of a horizontal surface, a vertical surface, an angular surface, a curved surface, and an uneven surface.

3. The aerial vehicle according to claim 2, wherein the attaching support structure is selected from at least one of an electromagnetic core, a vacuum cup, a mechanical gripper, and any combination thereof.

4. The aerial vehicle according to claim 1, wherein the multi-directional landing structure is rotatably coupled to the body frame and detatchable from the body frame.

5. The aerial vehicle according to claim 1, wherein the multi-directional landing structure further comprises at least one sensor.

6. The aerial vehicle according to claim 5, wherein the at least one sensor is selected from at least one of an ultrasonic thickness sensor, a conductivity sensor, a thermal sensor, an Eddy current sensor, a surface profilometry sensor, an EMAT sensor, a spectral sensor, a gas sensor, a coating sensor, and any combination thereof.

7. The aerial vehicle according to claim 2, wherein the multi-directional landing structure further comprises at least one actuator configured to move the aerial vehicle along the angular surface.

8. The aerial vehicle according to claim 7, wherein the at least one actuator is controlled by a user or is autonomously controlled.

9. The aerial vehicle according to claim 1, further comprising a tethered cable to receive power, communicate data, or both receive power and communicate data.

10. The aerial vehicle according to claim 1, wherein the aerial vehicle communicates with a ground station wirelessly through a wireless repeater to enable non-line-of-sight communication.

11. The aerial vehicle according to claim 2, further comprising a controller to control movement of the multi-directional landing structure and the attaching support structure.

12. The aerial vehicle according to claim 5, further comprising a surface preparation means to prepare the angular surface prior to a measurement from the at least one sensor.

13. The aerial vehicle according to claim 4, wherein the multi-directional landing structure operates independently while detached from the body frame.

14. A method of inspection using an aerial vehicle, the method comprises:
positioning the aerial vehicle to an inspection position;
rotating a rotary arm by any arbitrary angle to enable landing on any angular surface for inspection; and
deploying a multi-directional landing structure to the angular surface.

15. The method according to claim 14, further comprises attaching the multi-directional landing structure to the angular surface using an attaching support structure, wherein the angular surface comprises any one of a horizontal surface, a vertical surface, an angular surface, a curved surface, and uneven surface.

16. The method according to claim 15, wherein the attaching support structure is selected from at least one of an electromagnetic core, a vacuum cup, a mechanical gripper, and any combination thereof.

17. The method according to claim 16, further comprises detaching the multi-directional landing structure from the body frame.

18. The method according to claim 14, further comprises measuring at least one measurement from the angular surface using at least one sensor.

19. The method according to claim 18, wherein the at least one sensor is selected from at least one of an ultrasonic thickness sensor, a conductivity sensor, a thermal sensor, an Eddy current sensor, a surface profilometry sensor, an EMAT sensor, a spectral sensor, a gas sensor, a coating sensor, and any combination thereof.

20. The method according to claim 15, further comprises moving the multi-directional landing structure using at least one actuator.

21. The method according to claim 20, further comprises manually controlling the at least one actuator via a remote control or automatically controlling the at least one actuator.

22. The method according to claim 14, further comprises powering, controlling, or powering and controlling the aerial vehicle via a tethered cable.

23. The method according to claim 14, further comprises wirelessly communicating between a ground station and the aerial vehicle through a wireless repeater to enable non-line-of-sight communication.

24. The method according to claim 18, further comprises preparing the angular surface prior to measuring the at least one measurement.

25. The method according to claim 17, further comprises moving the multi-directional landing structure on the surface in any direction while detached from the body frame.

* * * * *